United States Patent [19]

Hungerford

[11] 4,405,550

[45] Sep. 20, 1983

[54] MANUFACTURE OF POLYIMIDE FILM BY SOLVENT CASTING

[75] Inventor: Gordon P. Hungerford, Palmyra, N.Y.

[73] Assignee: Mobil Oil Corporation, New York, N.Y.

[21] Appl. No.: 255,028

[22] Filed: Apr. 17, 1981

[51] Int. Cl.³ .......................... B29D 7/02; B29D 7/24
[52] U.S. Cl. .................................. 264/216; 264/290.2; 528/73; 528/229; 528/353
[58] Field of Search ............................ 264/216, 290.2; 428/473.5; 528/353, 73, 229

[56] References Cited

U.S. PATENT DOCUMENTS

| | | | |
|---|---|---|---|
| 3,247,165 | 4/1966 | Rodia | 264/216 |
| 3,619,461 | 11/1971 | Gary | 528/353 |
| 3,862,897 | 1/1975 | Gattus et al. | 264/216 |
| 3,867,500 | 2/1975 | Traynor | 264/216 |
| 3,899,309 | 8/1975 | Hoehn et al. | 528/353 |
| 4,066,731 | 1/1978 | Hungerford . | |
| 4,272,467 | 6/1981 | Johnson | 264/216 |

Primary Examiner—James B. Lowe
Attorney, Agent, or Firm—Alexander J. McKillop; Michael G. Gilman; James P. O'Sullivan, Sr.

[57] ABSTRACT

Polyimide film is manufactured by solvent casting onto a film-supporting surface. A solution of polyimide resin is dissolved in hot organic solvent to provide a casting dope. The film is coagulated by contacting an aqueous medium, substantially replacing the organic solvent in the film with water. Orienting the water-containing film and drying the oriented film to remove water produces a substantially homogeneous polyimide film having high electrical resistance, flexibility and strength.

12 Claims, 1 Drawing Figure

MANUFACTURE OF POLYIMIDE FILM BY SOLVENT CASTING

BACKGROUND OF THE INVENTION

This invention relates to polyimide film materials and processes of producing these materials by solvent casting.

Aromatic polyimides have been used in high temperature applications, since these materials retain high strength under continuous use at temperatures up to about 300° C. and even higher for brief periods. Continuous films, foils, sheets, cloth and/or laminates are particularly desirable for use in high temperature electrical insulation due to the thermal stability and resistance of these resins. Fully polymerized imide resins require no post cure to develop the high temperature properties. Solution spinning or casting techniques can be employed for making various stock shapes in continuous manufacturing processes, using commercially available solutions of polyimides in polar solvents, such as dimethylformamide.

While imide resin substrates may be employed for flame-resistant circuit boards, radomes, etc., a large use is found in thin film for wrapping electrical motors or the like, where these materials can withstand long-term high temperatures without loss of mechanical or electrical properties. Thermoset polyimides are particularly valuable as films, with fused-ring aromatic moieties contributing high thermal stability. High tensile strength over a wide temperature range, dimensional stability, wear resistance, high dielectric strength, chemical resistance, and radiation resistance are properties which are desirable for the many uses of polyimides. Polyimide film, such as "Kapton", has found use in compact electrical motors, where high dielectric strength, and toughness are important, as well as in insulation for aircraft and missile cable, etc. In wrapping insulation film, flexibility and elongation of the film are important to permit the polyimide to conform to the substrate shape. Films made by solution casting can be oriented after removing at least a portion of the solvent, as by evaporation from the film. Molecular orientation may be effected by stretching the film in machine direction orientation (MDO) and/or transverse direction orientation (TDO) at orientation temperature. Typical prior films made by this process may have 10% to 25% elongation before breaking under tensile stress.

SUMMARY OF THE INVENTION

It has been discovered that polyimide films having superior properties can be made by a novel solution casting and solvent washing process, which permits orientation of polymeric aquagel.

An improved method has been found for making a film by casting a film of a hot concentrated polymer solution in organic solvent onto a cooled surface to provide a film comprising polymer and aprotic solvent, wherein the film is contacted with aqueous medium to substantially remove the solvent from the film and incorporate water therein. Advantageously, the casting dope consisting essentially of a thermally-stable polyimide resin having high electrical resistivity, and at least one polar organic solvent including low molecular weight N,N-dialkyl carboxylamides, aliphatic or cycloaliphatic sulfoxides or sulfones, N-alkyl pyrrolidones, and heterocyclic nitrogen compounds, wherein the polyimide is present in the amount of at least about 40 weight percent.

It has been found that slowly coagulating the cast polyimide film containing organic solvent by contacting the cast film with an aqueous medium containing a major amount of organic solvent (i.e., up to about 95%) and containing a minor amount of water provides a controlled concentration gradient between the film and aqueous medium, resulting in a uniform, orientable material. In a preferred embodiment the film is transported countercurrently in contact with an aqueous medium of increasing water content in the direction of the film travel to remove substantially all of said organic solvent therefrom to provide an orientable, self-supporting film consisting essentially of polyimide resin and water. The resulting polymeric imide aquagel is a unique material which can be oriented and dried to produce optically clear film, essentially free of inhomogeneities and possessing superior physical properties. Biaxially oriented polyimide film according to this invention possesses excellent elongation properties, greater than 25% at break, which can be advantageous in many applications. Essentially complete removal of organic solvent provides improved high temperature performance for the polyimides. These and other advantages of the invention will be seen in the following description and in the drawing.

THE DRAWING

FIG. 1 is a schematic representation in sideview of a system for producing aquagel film; and FIG. 2 is a schematic sideview of a system for orienting and drying film according to the present invention.

DESCRIPTION OF PREFERRED EMBODIMENTS

In the following description metric units and parts by weight are employed unless otherwise stated.

Film feedstock to be fed to the orientation system can be derived from continuous film casting or extruding equipment. Flat film may be solvent cast according to the process of U.S. Pat. No. 4,066,731, wherein polymer is cast onto a rotating drum from a sheeting die and coagulated as a self-supporting film. Organic solvent, such as dimethyl sulfoxide, can be washed with a water bath to obtain an aquagel film containing at least about 30% water, integrally bound in the molecular interstices or dispersed in the orientable polymeric matrix. A tubular film can be extruded and water-coagulated if desired, according to the teachings of U.S. Pat. No. 4,144,299 and the unoriented film can be slit and fed to the orientation units as a flat strip.

The film manufacturing process can be controlled to obtain varying degrees of film properties. Ordinarily, an ultra-homogeneous casting solution contributes to film integrity. Where microgel solids become included in the aquagel film, discontinuities during orientation can cause holes in the film, especially thin film in the 10 to 25 micron range (dry basis).

Figure 1:
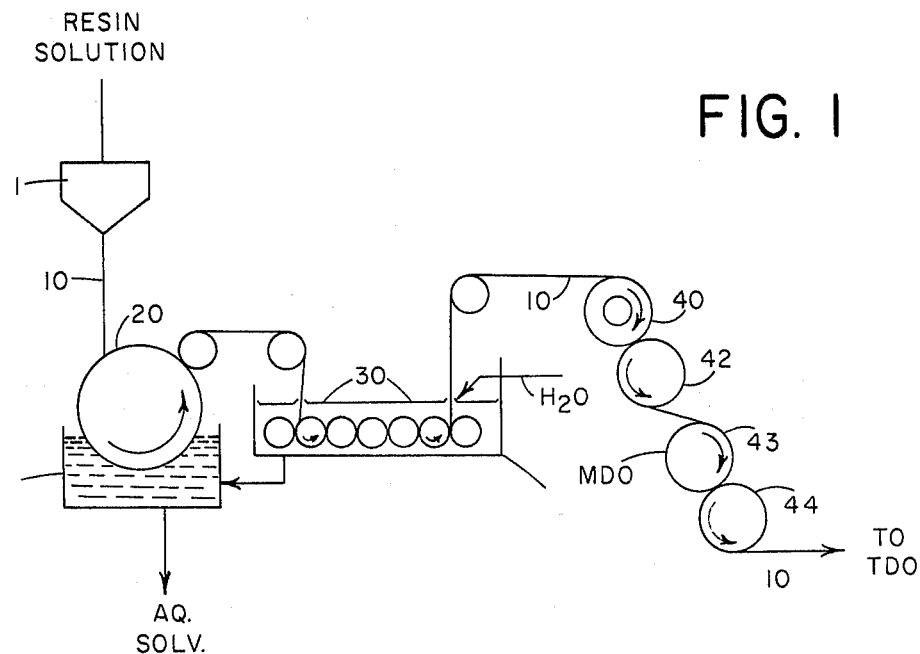

Referring to FIG. 1, a continuous line is shown for manufacturing aquagel film. For instance, hot polyimide resin solution is fed under pressure to sheeting die 1, forming a thin film of polymer solution (about 1 mm) which is drawn onto cold drum surface 20. After contacting an aqueous coagulation medium, the self-supporting aquagel film is stripped from drum 20 and traverses a countercurrent aqueous bath 30, wherein the organic solvent is removed and replaced by water, thereby forming the aquagel. The film 10 passes through the machine direction orientor (MDO) 40 comprising a first heated roll and thereafter a series of MDO orienting rolls 42, 43, 44 which are maintained at a sufficient differential speed to longitudinally stretch the web (about 1.1 to 3×), thereby providing a uniaxially oriented aquagel film. Thereafter the film is transferred to the subsequent treatment sections shown in FIG. 2.

Figure 2:
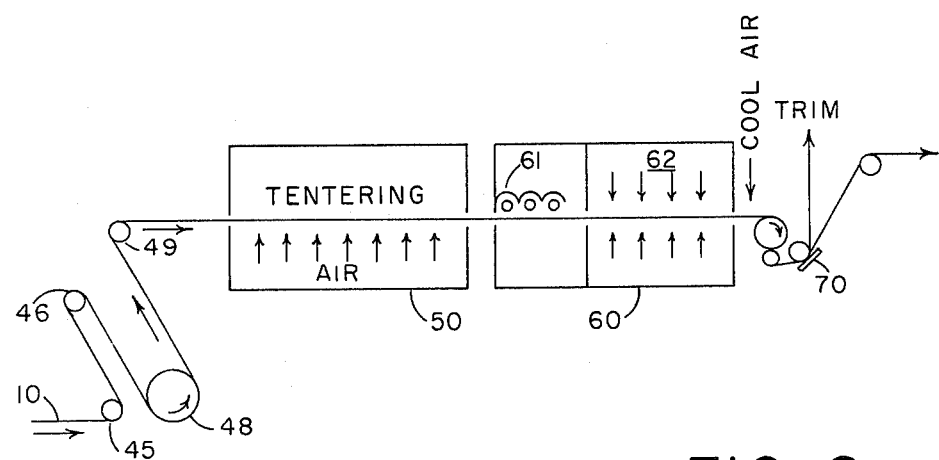

Referring to FIG. 2, the uniaxially oriented aquagel film 10 is passed over a series of rolls 45, 46, 48, dancer idler 45, web guide 48 and feed roll 49.

The film then passes through a transverse direction orientation (TDO) unit 50. The transverse direction orientation (TOD) step is usually effected by attaching edge clips to the film progressively and stretching the film perpendicular to its machine direction travel, the edge portions often become damaged and are ordinarily trimmed from the finished product. In the TDO unit the film may be contacted with moist hot gas to prevent excessive water loss. Means for impinging hot water-saturated air or the like at high velocity can be provided in a standard tentering apparatus.

The biaxially-oriented film is dried under constraint to remove water and other residual volative materials which may be present in the film. As the film passes through the drier unit 60, it receives energy from a bank of radiant heaters 61 and thereafter is completely dried in oven section 62, where hot air at about 100° C. to 300° C. is directed toward the film at high velocity. Thereafter the film is reduced to handling temperature by a stream of cool air at the exit end of drier 60 and trimmed by slitting blades 70 to remove the edge portions. The biaxially oriented film may then be wound onto a spool for storage or further processed by addition steps or taken directly to a fabrication line.

The polyimide resin casting dope may be provided by dissolving a commercially available dry resin in a suitable solvent or by preparing the polymer directly in the solvent by in situ polymerization. After the dissolution or polymerization steps, the casting dope may be adjusted to the optimum concentration for film forming. Advantageously, a hot casting dope containing at least 40 weight percent is employed.

It has been found desirable to minimize the amount of solvent being transported through the film during initial coagulation. Where the casting solution contains a large fraction of organic solvent, and the aqueous coagulant medium is rich in the organic solvent, a relatively small concentration gradient is maintained for those materials being transferred across the film-liquid interface. Thus, a limited amount of water is permitted to migrate into the cast film during the first moments of contact with the coagulant. This prevents distorting or disrupting the film at a sensitive point in the production line.

By transporting the cast film countercurrently through a bath of increasing water content, the solvent is replaced gradually. While the countercurrent technique may be employed with a series of aqueous baths, it is preferred to pass the film through a series of baffled compartments having means for flowing the aqueous medium towards the casting section in continuous manner.

The length of travel, residence time and operating conditions for the washing section can be varied considerably within the inventive concept. Ordinarily, the aqueous media are maintained at a temperature in the range from ambient to boiling (i.e., about 20° C. to 100° C.); however, the conditions can be optimized for pressure, temperature and bath concentration according to the particular requirements of the film being manufactured and production equipment. The concentration profile of water and organic solvent in the coagulating and washing sections may be adjusted by adding or removing one or more components at various points in the line.

Ordinarily, essentially pure water is added at or near the end point for film travel. At this point, little or no organic solvent or other water-soluble components remain in the film. As the water progresses countercurrently to the film, it becomes solvent-rich and loses water to the film by replacement. At the coagulation section the aqueous medium has become quite rich in solvent; however, it may be required under some circumstances to add more solvent to achieve the desired concentration for initial coagulation. Complete miscibility between water and the organic solvents employed is desirable throughout the system.

A concentrated solvent mixture in the aqueous medium can be removed intermittently or continuously from the coagulation section. The rate can be coordinated with the casting rate and/or wash water addition rate to maintain the proper concentrations for the aqueous medium. Heating and cooling means may be provided at various points along the line to provide the desired operating temperatures or thermal profile.

Since the removal of solvent from the film is a diffusion-controlled process, concentration differential may be controlled within limits to achieve the desired migration rates for solvent and water. Temperature control in the coagulation step can also affect migration rates.

Aprotic solvents for making casting dopes may include one or more suitable organic compounds which give homogeneous solutions of the imide polymers at elevated temperature. The preferred solvents are liquid at room temperature or melt slightly above ambient and are highly soluble in water or completely miscible over a wide temperature range.

Various sulfoxides, sulfones, carboxamides and heterocyclic compounds meet these requirements, such as N-methyl-2-pyrrolidone, N,N-dialkyl formamides, (dimethyl formamide, DMF) and acetamides, dialkyl sulfoxides (dimethyl sulfoxide, DMSO) and sulfones can be used advantageously. Those solvents having a relatively high vapor pressure at the extrusion or casting temperature are particularly useful, especially those low molecular weight compounds having a normal boiling point of more than 160° C. and/or a molecular weight of about 75 to 150. It is understood that compatible mixtures of solvents may be used in the casting dope and/or coagulation compositions.

The resin-solvent dopes can be extruded or cast at various temperatures, depending upon concentration and pressures. Temperatures of about 50° C. to 100° C. give satisfactory results for many solvents. The hot dope can be cast onto a film-supporting cooled surface at a temperature sufficiently low to set the polymer shape. For instance, a hot 45% polyimide dope can be cast on a cool rotating drum from a sheeting die, with an extrusion temperature of about 80° C. and a drum temperature of less than 10° C. If a very cold aqueous medium is employed in the coagulation zone, water alone suffice to obtain acceptable film. However, a bath rich in solvent is usually employed at ambient temperature or higher.

The preferred polyimide resins for use herein comprise recurring units containing the reaction product of an aromatic hydride with a polyisocyanate or polyamide to provide a moiety having the formula

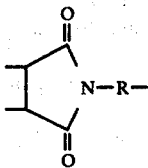

wherein R is an organic residue.

The above ring structure may be joined to an adjacent benzenoid unit having at least one functional substituent for forming imide, amide or other linkages. Typical reactants forming polyimides include pyromellitic dianhydride, benzophenone-3,3',4,4'-tetracarboxylic acid dianhydride or other aromatic polyanhydrides having at least one benzene or polynuclear ring structure. Compounds, such as trimellitic anhydride, having different functional groups may be employed in making imide-amide copolymers, as disclosed in U.S. Pat. No. 4,115,372.

Typical polyimide resins may be obtained by reacting anhydride-containing compounds with one or more polyisocyanates, such as toluene, diisocyanate or methylene-bis(phenylisocyanate) or the corresponding aromatic diamines, as described in U.S. Pat. No. 3,708,458 (Alberino et al), incorporated herein by reference.

In general a high aromatic content is desirable for thermal stability of the resins. Although numerous modifications of amidic polymers are feasible with the incorporation of aliphatic moieties, such as $\alpha,\omega$-dialkanoic acids to provide compatible amide linkages, desirable high temperature properties may be diminished thereby. The phthalimide moiety:

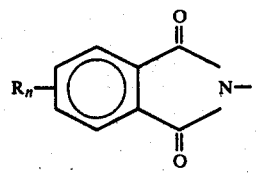

is obtainable from a variety of reactants disclosed herein and can be linked to thermally stable aromatic residues through reaction of aromatic anhydrides with diisocyanobenzenes, anilines and the like.

For those polyimides which are substantially amorphous, a relatively high glass transition temperature is found to be advantageous, usually greater than 250° C., i.e., about 280° C. to 320° C.

Aquagel polymeric films may be prepared from mixed resin casting dopes, wherein two or more compatible resins are codissolved in aprotic solvent. Organic solvents or mixtures thereof having appropriate solubility parameters for the resins, additives, etc., can be chosen to produce a homogenous mixed polymer matrix with orientation capacity. For instance, mixtures of polyimides, amides, polyacrylonitriles, or other compatible resins may be blended in suitable ratio to obtain the desired film properties.

Polyimide resins of the class described may be moldable; however, their high viscosity in molten form prevents practical extrusion, even at elevated temperature without a suitable solvent. Production of thin films, tubes, foils or similar extruded shapes from high viscosity melts is impractical, due to the large pressure drop across a thin orifice. Accordingly, in making film economically the solvent casting technique is found to be desirable. This method permits thin films of less than 25 microns (1 mil) to be formed continuously by forcing the resin solution through a slot die, slit-ring orifice or the like. The extruded shape is cooled and contacted with an aqueous medium under conditions which assure film integrity and clarity. Slow coagulation of the polymer and replacement of the organic solvent with water can provide a self-supporting film, which can be washed essentially free of solvent prior to film finishing.

The solvent-free polymeric aquagel may be oriented at this point or dried immediately. Unoriented polyimide without organic solvent is a valuable product having superior properties, especially optical clarity and thermal stability. Residual organic solvent adversely affects high temperature performance of polyimides, and complete removal is desirable. It is generally believed that orienting a polymer before removing the solvent renders the structure more dense and hinders solvent migration. Solvent leaching by water washing overcomes this problem, resulting in a finished dry film consisting essentially of the oriented polymer, free of solvent and other volatile matter which might decrease the electrical properties of the product.

The aquagel form of the inventive structure, an intermediate product of manufacture having possible use per se, may be considered a material intermediate between a solid and a liquid. A polymeric matrix, consisting of polyimide as the essential major macromolecular component, is a network of long-chain molecules. The gel properties are the interaction between the finely dispersed aqueous phase, created by displacement of aprotic solvent in the film and the continuous polymeric phase. During the molecular orientation steps, the liquid phase prevents the polymeric matrix from collapsing into a compact mass, while the matrix inhibits or prevents the liquid from flowing. Typically, polyimide gels are soft and resilient, having an elastic behavior.

While phase interactions during stretching of the wet aquagel film are not well understood, at orientation temperature the aquagel is shown to have an enhanced capacity for undergoing molecular orientation. Polymer to liquid ratios (pol:$H_2O$) for aquagel systems having significant orientation may vary considerably within the inventive concept, preferably between about 3:1 to 1:2.

EXAMPLE 1

A 25% solution of Upjohn 2080 polyimide resin in DMF is cast into sheet form and partially dried by radiant heat to raise the polymer concentration before coagulation. The cast film containing about 45–50% resin is coagulated by contact with cold water (5°–10° C.), stripped from the casting surface and washed in warm water to remove the organic solvent. The resulting clear aquagel contains about 30% water and has a thickness of about 100 to 150 microns before finishing. This sheet can be oriented biaxially by inflation or stretching, as described above. The oriented film is oven dried (105° C.) under restraint to prevent shrinkage. For purpose of comparison with prior film-forming methods, the physical properties are tabulated below.

TABLE 1

| | Film Properties | | | |
|---|---|---|---|---|
| | Water-Treated Solvent Cast | | Untreated Solvent-Cast | |
| | Un-oriented | (Example 1) Oriented | Un-oriented | Oriented (MD) |
| Ultimate Tensile Stress (kpsi) | 18 | 20.9 | 17 | 27 |
| % Elongation at Break | 23 | 41 | 6.7 | 23 |
| Yield Stress (kpsi) | 18.3 | 20 | — | — |
| Tensile Modulus (kpsi) | 342 | 394 | 367 | 517 |

The most significant improvement in properties is the increase in elongation, which is especially advantageous for wire-wrapping applications. Even without orientation the water-coagulated film was equal to the oriented prior art solvent-cast film. The new film also is less stiff than the equivalent oriented prior film.

EXAMPLE 2

A hot 22 wt. % DMF solution of Upjohn polyimide 2080 resin is concentrated and cast on a cooled surface, stripped and coagulated in concentrated DMSO aqueous solution. Satisfactory film can be obtained with a 95% DMSO aqueous solution. After washing in warm water an orientable, clear, self-supporting aquagel film is obtained containing about 30 wt. % $H_2O$. The dried film is essentially free of volatile materials, including water and organic solvents.

EXAMPLE 3

A hot solution of Upjohn 2080 polyimide resin containing 40 to 45% resin in N-methyl-2-pyrrolidone is cast on a cold drum immersed in cold water (5°–10° C.) to coagulate the film, which is washed in warm water to remove the organic solvent. The aquagel film is biaxially oriented by stretching to obtain a clear continuous film having good elongation properties.

EXAMPLE 4

Using a continuous solvent casting system as described, a polyimide film is made by feeding to a standard screw extruder a 40 wt. % solution of polyimide resin in dimethyl sulfoxide (DMSO). The hot casting dope is forced through a sheeting die having a slit orifice onto a rotating cold drum. After coagulation by contacting the cast film with concentrated aqueous DMSO solution, the film is washed countercurrently, oriented and dried under restraint to obtain an oriented polyimide.

It is believed that the formation of an aquagel structure with water dispersed in the continuous polymeric phase provides a plasticizing effect on the film, which significantly facilitates the stretching during orientation. The water is finely dispersed in the interstices of the polymeric matrix, and the aquagel may have significant utility as a membrane for various chemical processes, such as electrochemical cells, diffusion/barrier film, etc.

What is claimed is:

1. A method for making optically clear oriented polyimide film comprising:
   (a) applying onto a film supporting cooled surface a hot concentrated solution of polyimide in a polar aprotic organic solvent to provide a film comprising said polymer and said solvent;
   (b) comparatively slowly coagulating the polymer by contacting said film with an aqueous medium containing a major amount of organic solvent and a minor amount of water;
   (c) at least substantially replacing the solvent in said film with water;
   (d) machine direction orienting said water-containing film; and
   (e) transverse direction orienting said water-containing film; and
   (f) drying the biaxially oriented film while under constraint to remove at least substantially all water.

2. The method of claim 1 wherein said aprotic solvent comprises one or more low molecular weight N-alkyl-2-pyrrolidones, pyridines, sulfoxides, sulfones, N,N-dialkyl-carboxamides, wherein said polyimide solution comprises a hot dope containing at least about 45 wt. % polyimide resin.

3. The method of claim 2 further comprising the step of passing the coagulated film through an aqueous medium having increasing water content and decreasing organic solvent content in the direction of film transport.

4. The method of claim 3 wherein said film is transported through a body of aqueous medium moving countercurrently to the film, said film being finally contacted with wash water to remove substantially all organic solvents therefrom.

5. The method of claim 3 wherein said aprotic solvent consists essentially of N-methyl-2-pyrrolidones.

6. The method of claim 5 wherein said aqueous medium initially contacting said film is maintained at an organic solvent content of at least about 95 weight percent.

7. The method of claim 1 wherein the polyimide contains a major portion of repeating units containing the moiety:

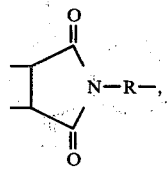

where R is an organic residue.

8. The method of claim 1 wherein the polyimide resin comprises the reaction product of at least one aromatic polycarboxylic acid anhydride with aromatic polyisocyanate or polyamine.

9. The method of claim 8 wherein the anhydride consists essentially of pyromelletic dianhydride, benzophenone-3,3',4,4'-tetracarboxylic acid dianhydride or mixtures thereof with one another.

10. The method of claim 1 wherein said polyimide comprises the polymeric reaction product of at least one aromatic polycarboxylic anhydride and at least one polyisocyanate and wherein said resin solution contains up to about 40 weight percent of aprotic polar solvent.

11. The method of claim 2 wherein said aprotic polar solvent consists essentially of dimethyl sulfoxide.

12. The method of claim 2 wherein said aprotic polar solvent consists essentially of N-methyl-2-pyrrolidone.

* * * * *